Figure 1:
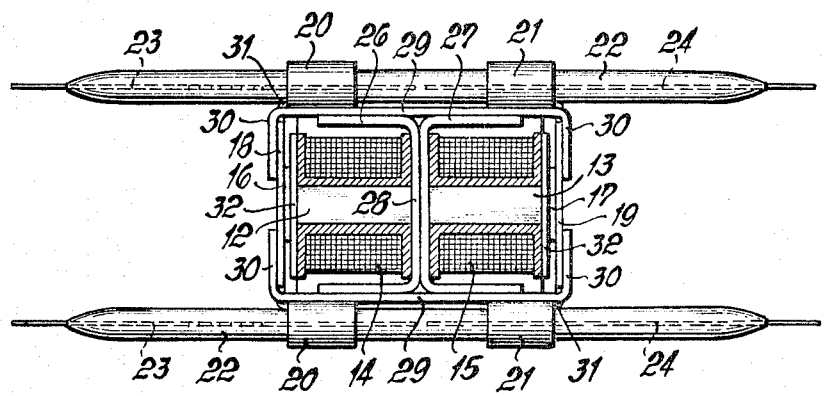

Sept. 27, 1966   E. K. GÄRTNER ETAL   3,275,960

BISTABLE MAGNETICALLY CONTROLLED SWITCH

Filed Aug. 16, 1965

INVENTORS:

3,275,960
BISTABLE MAGNETICALLY CONTROLLED SWITCH

Edmund K. Gärtner, Frankfurt am Main, and Thea Schaffert, Petterweil, Germany, assignors to Telefonbau und Normalzeit G.m.b.H., Frankfurt am Main, Germany
Filed Aug. 16, 1965, Ser. No. 480,006
Claims priority, application Germany, Oct. 23, 1964, T 27,269
8 Claims. (Cl. 335—79)

This invention refers to bistable electromagnetically controlled switches, and more particularly to electromagnetically controlled reed switches.

It is a general object of this invention to provide improved switches of the aforementioned description.

Another object of this invention is to provide bistable electromagnetically controlled switches which are more readily adjustable than comparable prior-art switches.

This invention refers more specifically to switches which include two aligned permanent magnets each associated with an energizing winding and each capable of having different states of remanent magnetism. In such switches the axially outer ends of the permanent magnets are associated flux-carrying sheet metal parts which project toward the reeds, or like contact controlling means, and the axially inner ends of the permanent magnets are provided with flux-carrying parts for carrying a magnetic flux generated by energization of the aforementioned energizing windings, and which determines the state of remanent magnetism of the particular permanent magnet.

In switches of the above description magnetization in the same sense of the two aligned magnets establishes a magnetic flux which operates a pair of reeds forming switch contacts. On the other hand, if the two aligned magnets are magnetized in the opposite senses rather than the same sense, then the magnetic action of the resulting flux upon the switch-contact-forming reeds is insufficient to operate the same.

Bistable electromagnetic switches of the above description are particularly useful in connection with matrix circuitry where it is desired that the switch be operated only if the energization of one energizing winding (energizing winding in a horizontal write line) coincides with the energization of the other energizing winding (energizing winding in a vertical write line). Opening of a bistable electromagnetically controlled switch that has been closed by magnetizing both permanent magnets in the same sense can be achieved with a symmetrical arrangement of both magnet systems and by providing each permanent magnet with two energizing windings of which one has twice the number of turns of the other.

In connection with bistable electromagnetic switches great difficulties have arisen in regard to the arrangement of the flux-carrying parts needed for changing the state of remanent magnetism of the magnets. The flux-carrying parts establish a magnetic shunt across the reeds forming the switch contacts, or current-carrying reeds. The reluctance of the path of the flux which changes the state of remanent magnetism of the switch is critical and must be relatively close to an optimal value. If the reluctance of the path of that flux is too low, this might amount, in effect, to a magnetic short-circuit across the reeds forming the switch contacts, or current-carrying reeds. On the other hand, if the reluctance of the path of that flux is too high, this results in an undue increase of the electric energy required for reversing the polarity of the pair of permanent magnets.

If the path of the magnetic flux used to change the state of remanent magnetism includes a portion of the reeds forming the switch contacts, or current-carrying reeds, or a portion of some magnetizable structure integral with the switch contacts, then it becomes extremely difficult to properly adjust the switch.

It is, therefore, another object of this invention to provide bistable electromagnetically controlled switches which are not subject to the aforementioned limitation or drawback.

Another object of this invention is to provide an improved version of the bistable electromagnetically controlled switches disclosed and claimed in United States Patent 3,067,304 to Georg Bergsträsser et al., issued December 4, 1962, for Switching Contacts Controlled by Magnetic Fields.

The drawings illustrate a preferred embodiment of the invention also embodying the teachings of the above Bergsträsser et al. patent.

In the drawings

Figure 2:
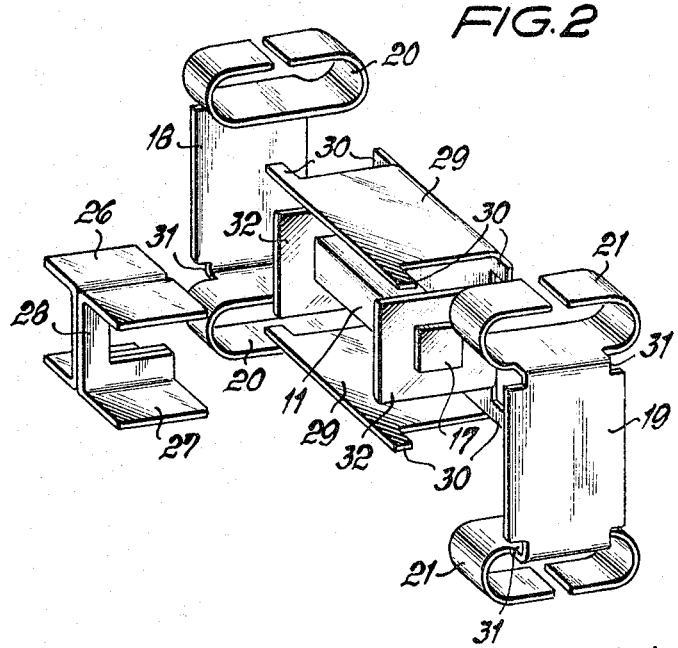

FIG. 1 is a diagrammatic vertical section across a reed switch embodying the present invention; and FIG. 2 is an isometric view of the magnetic flux path structure forming part of the switch illustrated in FIG. 1.

Referring now to the drawings, numeral 11 has been applied to generally indicate an elongated system of permanent magnets (see FIG. 2). This system comprises two aligned permanent magnets 12 and 13. Permanent magnet 12 is surrounded by a solenoid type energizing winding 14, and permanent magnet 13 is surrounded by a solenoid type energizing winding 15. The axially outer or remote pole surfaces 16, 17 of permanent magnets 12 and 13 abut against magnetizable, flux-carrying sheet metal parts 18 and 19. The upper ends and lower ends of flux-carrying sheet metal parts 18, 19 are bent out of the general planes defined by plates 18, 19 and shaped to form substantially annular brackets 20, 21 which support tubular envelopes 22 for housing the reeds forming the switch contacts. Each tubular envelope 22 houses a pair of reed contacts 23 and 24 which embody the teachings of the aforementioned Bergsträsser et al. patent, i.e. one of the reeds includes a region of reduced cross-sectional area which makes it possible for the axially inner end of the particular reed to move inside of the plane defined by that reed relative to the axially outer end of that reed and relative to the axially inner end of the other reed inside the same tubular envelope. The brackets 20 surround the axially outer portions of reeds 23, and the brackets 21 surround the axially outer portions of reeds 24. As a result of this arrangement, the fluxes established when permanent magnets 12 and 13 are magnetized in the same sense are conducted to the axially outer ends of reeds 23, 24 and cause attraction and mutual engagement of reeds 23, 24.

A portion of the conductor 28 of magnetic flux is arranged in the center of the permanent magnet structure 11, i.e. a portion of part 28 is arranged inside of the gap defined by the axially inner or juxtaposed pole surfaces of permanent magnets 12 and 13. Magnetic flux conductor 28 is made up of two substantially U-shaped, or channel-shaped, pieces 26, 27 of magnetizable sheet metal, arranged in such a way that their web portions abut against each other, thus forming a structure which is substantially I-shaped in cross-section. The axially outer ends of the flanges of the composite magnetic conductor structure 28 extend toward the brackets 20, 21 formed by parts 18 and 19. As a result, the flange portions of parts 26, 27 carry the magnetic flux established by the energization of windings or coils 14, 15 toward brackets 20, 21.

Reference numeral 29 has been applied to indicate a housing of non-magnetizable material housing or enclosing magnets 12, 13 and coils or windings 14, 15. The wall of housing 29 is arranged inside of a gap formed between the flange portions of parts 26, 27 and brackets 20, 21. In other words, the spacing between parts 26, 27 and brackets 20, 21 is determined by the thickenss of the wall of housing 29. The wall of housing 29 forms axially extending tab-like projections 30. Projections 30 engage shoulders 31 (see FIG. 2) formed by parts 18, 19 and the ends of projections 30 are bent 90 degrees (see FIG. 1) into planes parallel to the general planes defined by parts 18, 19. The bent surfaces of projections 30 engage the axially outer surfaces of parts 18, 19, and thus projections 30 form fasteners for securing parts 18, 19 to the pole surfaces 16, 17 of permanent magnets 12, 13. Reference character 32 has been applied to indicate the two sides of housing 29 extending parallel to the pole surfaces 16, 17 of permanent magnets 12, 13. The two sides 32 of housing 29 are provided with rectangular or square openings for the passage of the axially outer pole surfaces 16, 17 of magnets 12, 13, thus supporting the axially outer ends of magnets 12, 13 in the proper position thereof.

It will be apparent from the foregoing that the flange portions of parts 26, 27 abut against the inner surface of housing 29, and that the brackets 20, 21 abut against the outer surface of housing 29. Therefore the degree of overlap of parts 20, 26 and 21, 27, respectively, and the wall thickness of housing 29 determine the reluctance of the path of the magnetic flux extending through parts 26, 27 and through brackets 20, 21.

Housing 29 may be formed by appropriately folding a stamping made of a non-magnetizable material, e.g. non-magnetizable sheet metal. This stamping is folded to form a channel-shaped structure, and magnets 12 and 13 are arranged in a direction longitudinally of said channel-shaped structure. The axially outer ends 32 of that structure form tabs which, when bent 90 degrees, as shown in FIG. 2, transform the aforementioned channel-shaped structure into the box-shaped structure to which reference character 29 has been applied. As shown in FIG. 2 but the front side of the aforementioned box-shaped structure is open.

If both magnets 12 and 13 are magnetized in the same sense the path of their flux extends from pole surface 16 of left magnet 12 through parts 18 and 20, reeds 23, 24, parts 21 and 19 to pole surface 17 of right magnet 13. One of these parallel fluxes causes engagement of both reeds 23, 24 in one of the envelopes 22, and the other of these parallel fluxes causes engagement of both reeds 23, 24 in the other of the two envelopes 22. If both magnets 12, 13 are magnetized in the opposite senses, but small leakage fluxes extend from one of each of the reeds to the other, and these leakage fluxes are too small to cause engagement of cooperating reeds.

The structure embodying this invention establishes a magnetic coupling between the paths of the fluxes which operate reeds 23, 24 and the paths of the fluxes established by energizing windings 14, 15 which control the remanent magnetism of magnets 12, 13. Parts 20, 26 form magnetic shunts across reeds 23, and parts 21, 27 form magnetic shunts across reeds 24. The reluctance of these shunt path is precisely defined by the area of overlap of parts 20 and 26, and of parts 21 and 27, respectively, and by the spacing between overlapping areas. Hence the reluctance of the path of the flux controlling the state of remanent magnetism of permanent magnets 12, 13 is a fixed value to which exactly the required magnitude can readily be given. This does not apply to prior art designs of similar switches, wherein the path of the flux controlling the remanent magnetism of a pair of permanent magnets is not separate from a cooperating pair of magnetizable reeds, but extends through the pair of magnetizable reeds.

Having disclosed a preferred way of carrying our invention into effect, it is desired that the same not be limited to the particular arrangement of parts disclosed herein. It will be obvious to any person skilled in the art that many modifications and changes may be made without departing from the broad spirit and scope of the invention. Therefore it is desired that the invention be interpreted as broadly as possible, and that it be limited only as required by the prior state of the art.

We claim as our invention:

1. A bistable magnetically controlled switch comprising in combination:
    (a) a pair of aligned permanent bar magnets;
    (b) a pair of energizing windings each operatively related to one of said pair of magnets;
    (c) a pair of magnetizable reeds forming a pair of cooperating contacts;
    (d) a pair of flux-carrying members of magnetizable sheet metal each including a first portion arranged adjacent and parallel to remote pole surfaces of said pair of magnets and each including a second portion bent out of the general plane of said first portion and having an end situated immediately adjacent to one of said pair of reeds; and
    (e) a structure of magnetizable material including a portion arranged between juxtaposed pole surfaces of said pair of magnets and further including a pair of axial extensions each having an end overlapping said end of said second portion of one of said pair of flux-carrying members and separated from said end of said second portion of one of said pair of flux-carrying members by a gap of predetermined width.

2. A bistable magnetically controlled switch comprising in combination:
    (a) a pair of aligned permanent magnets;
    (b) a pair of energizing windings each operatively related to one of said pair of magnets;
    (c) a pair of magnetizable reeds forming a pair of cooperating contacts;
    (d) an envelope housing said pair of reeds;
    (e) a pair of flux-carrying members of magnetizable sheet metal each including a first portion arranged adjacent and parallel to remote pole surfaces of said pair of magnets and each including a second portion bent out of the general plane of said first portion and forming a bracket supporting said envelope and being arranged immediately adjacent one of said pair of reeds;
    (f) a structure of magnetizable material including a portion arranged between juxtaposed pole surfaces of said pair of magnets and further including a pair of axial extensions each having an axially outer end overlapping said bracket formed by one of said pair of flux-carrying members and separated from said bracket by a gap of predetermined width, said bracket formed by each of said pair of flux-carrying members and said pair of axial extensions forming a pair of gaps of predetermined width.

3. A bistable magnetically controlled switch comprising in combination:
    (a) a pair of aligned permanent bar magnets;
    (b) a pair of energizing windings each operatively related to one of said pair of magnets;
    (c) two pairs of magnetizable reeds, each of said pairs of reeds having juxtaposed ends forming cooperating contacts;
    (d) a pair of flux-carrying members of a magnetizable sheet metal each including a first portion arranged adjacent and parallel to remote pole surfaces of said pair of magnets and each including two other portions bent out of the general plane of said first portion and having ends situated immediately adjacent to the reeds of said two pairs of reeds; and
    (e) a structure of magnetizable material substantially I-shaped in cross-section, said structure including a web portion arranged between juxtaposed pole surfaces of said pair of magnets and further including flange portions extending in a direction longitudinally of said pair of magnets and overlapping said ends of said two other portions of said pair of flux-carrying members and being separated from said ends of said two other portions of said pair of flux-carrying members by gaps of predetermined width, said ends of said two other portions of said pair of flux-carrying members and said flange portions of said structure of magnetizable material defining two pairs of flux path of predetermined reluctance.

4. A bistable magnetically controlled switch comprising in combination:
 (a) a pair of aligned permanent bar magnets;
 (b) a pair of energizing windings each operatively related to one of said pair of magnets;
 (c) a pair of reeds of a magnetizable material forming a pair of cooperating contacts at juxtaposed ends thereof;
 (d) a pair of flux-carrying members of magnetizable material each including a first portion arranged adjacent and parallel to remote pole surfaces of said pair of magnets and each including a second portion bent out of the general plane of said first portion and having an end situated immediately adjacent to one of said pair of reeds; and
 (e) a structure of magnetizable material including portions enclosing angles of 90 degrees, one of these portions being arranged between juxtaposed pole surfaces of said pair of magnets and others of these portions extending in a direction longitudinally of said pair of magnets and overlapping said end of said second portion of said pair of flux-carrying members and having a fixed predetermined spacing from said end of said second portion of said pair of flux-carrying members.

5. A bistable magnetically controlled switch comprising in combination:
 (a) a pair of aligned permanent bar magnets;
 (b) a pair of energizing windings each operatively related to one of said pair of magnets;
 (c) a housing of non-magnetizable material enclosing said pair of magnets and said pair of windings;
 (d) a pair of magnetizable reeds forming a pair of cooperating contacts at juxtaposed ends thereof;
 (e) a pair of flux-carrying members of magnetizable sheet material each including a first portion arranged adjacent and parallel to remote pole surfaces of said pair of magnets and each including a second portion bent out of the general plane defined by said first portion and having an end in abutting engagement with the outer surface of said housing and situated immediately adjacent to one of said pair of reeds;
 (f) a structure of magnetizable material including a first portion arranged between juxtaposed pole surfaces of said pair of magnets and further including a pair of extensions projecting from said first portion in a direction longitudinally of said pair of magnets, each of said pair of extensions overlapping said second portion of one of said pair of flux-carrying members and being in abutting engagement with the inner surface of said housing.

6. A bistable magnetically controlled switch as specified in claim 5 comprising an envelope housing said pair of reeds, said envelope being supported by said second portion of said pair of flux-carrying members.

7. A bistable magnetically controlled switch as specified in claim 5 wherein sides of said housing juxtaposed to remote pole surfaces of said pair of magnets are provided with cut-outs and wherein remote pole surfaces of said pair of magnets project from the inside of said housing through said cut-outs to the outside of said housing.

8. A bistable magnetically controlled switch as specified in claim 5 wherein said second portion of each of said pair of flux-carrying members forms a substantially annular bracket supporting an elongated envelope housing said pair of reeds.

References Cited by the Examiner
UNITED STATES PATENTS

| | | | |
|---|---|---|---|
| 3,008,019 | 11/1961 | Schedig | 200—87 X |
| 3,188,425 | 6/1965 | Henquet et al. | 200—87 |
| 3,190,984 | 6/1965 | Ellwood | 200—87 |

BERNARD A. GILHEANY, *Primary Examiner.*

J. J. BAKER, *Assistant Examiner.*